United States Patent Office

3,637,702
Patented Jan. 25, 1972

3,637,702
1-[HYDROXYALKYL]-2-MORPHOLINOMETHYL-5-NITROIMIDAZOLES
Dale R. Hoff, Basking Ridge, N.J., and David W. Henry, Menlo Park, Calif., assignors to Merck & Co., Inc., Rahway, N.J.
No Drawing. Continuation-in-part of application Ser. No. 848,404, July 29, 1969, which is a continuation of application Ser. No. 717,464, Mar. 29, 1968, now abandoned, which is a continuation-in-part of application Ser. No. 565,333, June 17, 1966, now abandoned, which in turn is a division of application Ser. No. 355,428, Mar. 27, 1964, now Patent No. 3,299,090. This application Nov. 2, 1970, Ser. No. 86,331
Int. Cl. C07d 87/40
U.S. Cl. 260—247.5 R                      1 Claim

ABSTRACT OF THE DISCLOSURE

1-(2'-hydroxyethyl) - 2 - morpholinomethyl - 5 - nitroimidazole is a novel compound prepared from 1-(2'-hydroxyethyl) - 2 - hydroxymethyl - 5 - nitroimidazole, having utility against parasitic diseases, especially histomoniasis and trichomoniasis.

---

This application is a continuation-in-part of copending application, U.S. Ser. No. 348,404 filed July 29, 1969; which in turn was a continuation application of U.S. Ser. No. 717,464 filed Mar. 29, 1968, now abandoned; which in turn was a continuation-in-part of U.S. Ser. No. 565,333 filed June 17, 1966, now abandoned; which in turn was a divisional application of U.S. Ser. No. 355,428 filed Mar. 27, 1964, now U.S. Pat. 3,299,090.

This invention relates to new nitroimidazoles. More particularly, it is concerned with 2-(α-aminoalkyl)-nitroimidazoles. Still more specifically, it is concerned with 2-substituted-2-aminoalkyl-5-nitroimidazoles, with 1-substituted - 2 - substituted - aminoalkyl - 5 - nitroimidazoles and with methods for the chemical synthesis of such new compounds. It relates further to the use of such substances against parasitic infections and to anti-parasitic compositions containing such substances as active ingredients.

Although various nitroimidazole compounds have been described as useful against certain parasitic diseases, in particular against the poultry disease histomonoiasis and the protozoal infection trichomoniasis, the search has continued for new, more active and less toxic agents for the treatment of these diseases.

Trichomoniasis is a disease caused by the protozoan parasite *Trichomonas vaginalis*. *T. vaginalis* primarily infests the human vagina and is the etiological agent of a very troublesome and prevalent form of vaginal infestation known as *T. vaginalis* vaginitis. The drugs heretofore commercially available for treating this condition have certain limitations and disadvantages. In partcular, there has been a need for an anti-trichomonal substance that is effective when administered orally as well as topically.

Histomoniasis is a poultry disease caused by the protozoan parasite *Histomonas meleagridis*. This disease, which affects turkeys, is also known as turkey blackhead or enterohepatitis. It is a serious economic problem to the turkey-raising industry since it spreads rapidly in turkey flocks and the mortality rate may be as high as 80%. The compounds now commercially available for treating turkey blackhead are of benefit, but none of them has proven to be entirely satisfactory. Among the disadvantages are development of resistant strains of the infecting organism, and undesired side effects when fed to the birds at the levels required to treat the disease.

It is an object of the present invention to provide a new class of antitrichomonal and antihistomonal agents. It is a further object to provide a new and novel class of nitroimidazoles having a significant degree of antiprotozoal activity. Another object is provision of 2-substituted-5-nitroimidazoles having an α-aminoalkyl or α-substituted aminoalkyl group at the 2-position of the imidazole ring. An additional and more specific object is provision of 2-aminomethyl-5-nitroimidazoles and 2-substituted-aminomethyl-5-nitroimidazoles having a lower alkyl, hydroxyloweralkyl or acyloxyloweralkyl radical at the 1-position of the imidazole ring. Another object of the invention is provision of methods for making such 1,2-disubstituted-5-nitroimidazoles. An additional object is provision of antitrichomonal and antihistomonal compositions containing the imidazole compounds of this invention as active ingredients. A still further object is provision of methods for treating and/or preventing trichomoniasis and histomoniasis by administration of the novel imidazoles of this invention. Other and more specific objects will become clear from the following description of our invention.

The novel compound of this invention is

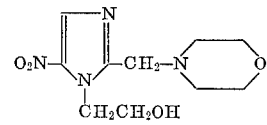

or 1-(2'-hydroxyethyl)-2-morpholinomethyl-5-nitroimidazole.

Also within the purview of the invention are acid addition salts of the compound of the above formula. The preferred salts are the relatively non-toxic mineral acid salts such as the hydrochlorides, sulfates, and nitrates. Organic acid salts, such as the acetate, citrate, tartrate, oxalate and the like, may also be prepared. In some cases, it may be preferred to employ the product in the salt rather than the free base form in treating the parasitic diseases previously mentioned.

The compound of the present invention is prepared from 1 - substituted - 2 - hydroxymethyl-5-nitroimidazole according to a process which comprises broadly the reaction of said 2-hydroxymethyl imidazole with a halogenating agent to obtain a 1-substituted-2-halomethyl-5-nitroimidazole, and reaction of such halomethyl imidazole with an amine to produce a 1-substituted-2-substituted-aminomethyl-5-nitroimidazole.

According to the first reaction of this invention 1-(acyloxyalkyl)-2-hydroxymethyl-5-nitroimidazole is intimately contacted with a halogenating agent in order to convert the 2-hydroxymethyl substituent to a 2-halomethyl radical. It is preferred to form either the chloromethyl, bromomethyl or iodomethyl imidazole by treating the starting material with the appropriate halogenating agent. When the starting material contains a hydroxyalkyl group at the 1-position, this group is "blocked" by acylation prior to the halogenating step in order to prevent undesired side reaction. This is accomplished by converting the hydroxyalkyl moiety to a benzoyloxy or lower alkanoyloxy derivative via treatment with an acylating agent.

Suitable chlorinating agents which may be used satisfactorily in this reaction are thionyl chloride, aqueous concentrated hydrogen chloride, phosphorus oxychloride, phosphorous pentachloride and phosphorus trichloride. The preferred brominating agents are aqueous concentrated hydrogen bromide, thionyl bromide or phosphorus tribromide. Hydrogen iodide is conveniently employed as halogenating agent to make the 2-iodomethyl compounds. This aspect of the invention is not limited to these particular halogenating agents and other equivalent halogenating agents may be used if desired. The halogenation is brought about by intimately contacting the 1-substituted- 2 - hydroxymethyl-5-nitroimidazole and the halogenating agent in a suitable reaction medium. An excess of halogenating agent is generally used, and where such reagents are liquid and easily removed at the completion of the reaction, the excess halogenating agent itself may serve as the solvent medium. This is convenient, for example, when thionyl chloride is used as the reagent. It is generally preferred, however, to carry out the reaction in an organic solvent which is inert under the reaction conditions. Examples of such solvents are aromatic hydrocarbons such as benzene, toluene, xylene, and the like, chloroform, dimethoxymethane and methylene chloride. The time and temperature of the reaction are not critical and halogenation may be carried out at room temperature or at elevated temperature. Reaction temperatures of from about room temperature to about 75° C. give very satisfactory results and under these conditions the halogenation is essentially complete in from about 15 minutes to 3 hours. The 1-substituted-2-halomethyl-5-nitroimidazole is formed as an acid addition salt, i.e., as the hydrochloride or hydrobromide. The acid addition salts of these nitroimidazoles are much more highly crystalline than are the free bases and for this reason it is preferred to isolate the salts. The imidazole free base is obtained by treating an aqueous solution of the salt with base and extracting the resulting imidazole base into an organic solvent such as chloroform. If desired, these 2-halomethyl-5-nitroimidazoles having a 1-acyloxyalkyl radical may be hydrolyzed with acid to the corresponding 1 - hydroxyalkyl compounds although, as previously stated, it is preferred to carry out the amine reaction prior to the acid hydrolysis.

Representative examples of 2-haloalkyl-imidazoles provided by this invention are 1-methyl-2-bromomethyl-5-nitroimidazole, 1-ethyl-2-iodomethyl-5-nitroimidazole, 1-methyl-2-(α-chloroethyl)-5-nitroimidazole, 1-(β-acetoxyethyl)-2-chloromethyl-5-nitroimidazole, 1-propyl-2-chloromethyl-5-nitroimidazole, and 1-(γ-benzoyloxypropyl)-2-bromomethyl-5-nitroimidazole.

The 1-substituted-2-halomethyl-5-nitroimidazole compounds obtained as described above are converted to the corresponding 2-morpholinomethyl imidazole by reaction with morpholine.

This reaction is brought about by intimately contacting the 2-halomethyl-5-nitroimidazole with an excess of the morpholine. At least a 2:1 molar ratio of amine to halomethyl imidazole is used for best results in this process, and in many cases molar ratios of up to 15:1 are desirable. When the 1-substituted-2-halomethyl-5-nitroimidazole is charged to the reaction as an acid addition salt instead of the free base, additional amine is required to neutralize the acid salt, and the amount of amine reactant is increased appropriately.

The process is carried out in a suitable solvent medium. It is preferred to employ an organic solvent that is non-reactive with either the halomethyl imidazole or the amine reactants. Examples of suitable solvents are the aromatic hydrocarbons such as benzene, toluene or xylene, diloweralkyl amides such as dimethylformamide or dimethylacetamide, a lower alkanol, e.g., methanol, ethanol or isopropanol, an aqueous lower alkanol, chloroform, acetonitrile or a ketone such as acetone, methylethyl ketone or methyl isobutyl ketone. In those cases where the amine reactant is liquid at the reaction temperature, an excess of such amine can serve as the solvent medium.

The reaction time and temperature are not critical features of the process except to the extent that it is convenient, and preferred, that the temperature be one at which the reactants are liquids. In the case of low boiling amines such as methylamine and dimethylamine, the reaction is generally carried out in the cold. However, with most primary and secondary amines elevated temperatures of up to about 150° C. are employed since the reaction rate is thereby increased. Formation of the 1-substituted - 2 - substituted-aminomethyl-5-nitroimidazole compounds takes place rapidly, and in most cases the reaction is substantially complete in from ½ to 2 hours, although longer times may be utilized if desired.

The resulting imidazole may be recovered by techniques known to those skilled in this art. Where the product is soluble in the reaction medium, the solvent and unreacted excess amine may be distilled off, the desired imidazole extracted into a suitable non-aqueous solvent such as chloroform or ethyl acetate, and then recovered in substantially pure form by removal of the solvent by distillation.

The 1 - acyloxyalkyl-2-morpholinomethyl - 5 - nitroimidazole is hydrolyzed to the corresponding 1-(hydroxyalkyl)imidazole by treatment with a dilute mineral acid such as hydrochloric or sulfuric acid.

The 1 - substituted-2-morpholinomethyl - 5 - nitroimidazole of this invention has a significant degree of anti-trichomonal activity and is thus useful in the treatment of trichomoniasis, i.e., *T. vaginalis* vaginitis. When employed in treating the protozoan disease trichomoniasis, it is administered orally, uniformly dispersed in a pharmaceutically acceptable carrier vehicle, usually in tablets, capsules, syrups, solutions and the like. Tablets or capsules containing from about 100 to about 500 milligrams of active anti-trichomonal ingredient are quite satisfactory and are prepared by techniques known to those skilled in the pharmaceutical art. Thus, these dosage forms will contain the normal diluents, excipients, lubricating agents, binders and extenders regularly employed in compounding solid oral dosage forms. The drug may, if desired, be suspended or dissolved in liquid vehicles designed for oral administration. Alternatively, it may be administered topically and for this purpose distributed in topical formulations such as creams and jellies. The anti-trichomonal activity of the compound of this invention is set forth below. Activity is expressed in terms of effective dose in mg./kg., as determined by the method described in Cuckler, Kupferberg & Millman, "Chemotherapeutic and Tolerance Studies on Amino-nitro Thiazoles" Antibiotics and Chemotherapy, 5: 540–550, 1955, and represents in vivo activity in mice.

Compound:                                  Activity (mg./kg.)

1-(2'-hydroxyethyl) - 2 - morpholinomethyl-5-nitroimidazole _____ 40

The compound of this invention is also effective in controlling enterohepatitis in turkeys. For this purpose it can be administered to turkeys mixed with an element of turkey sustenance, e.g., feed or drinking water. Good control of the disease is obtained when the imidazole compound of the invention is incorporated in a turkey feed ration at levels from about 0.003% to about 0.1% by weight and preferably from about 0.0125% to 0.05% by weight of the feed. The optimum concentration will depend to a large extent on the age of the birds, the severity of the infection and the particular nitroimidazole employed. With these feed levels good control of the disease is realized with essentially no undesirable side effects or retardation of growth of the turkeys. When the turkey feed or turkey ration is employed as the carrier vehicle it is desirable that the drug be uniformly mixed throughout the feed. This is accomplished by first preparing a premix or feed supplement composition wherein the active ingredient is present in concentrations from about 1% to about 40% by weight and where the carrier or diluent is a non-toxic orally ingestible vehicle. It is preferred that the carrier be a nutritive one, examples of which are corn distillers dried grains, wheat shorts, wheat middlings, soybean meal, fermentation residues and corn meal. These supplements or premixes are then uniformly mixed through the turkey ration by conventional techniques such as grinding or milling.

A second route of administration is by way of the drinking water of the turkeys. This is preferred when the turkeys are severly infected since the birds will normally continue to drink after they have stopped eating solid food. Somewhat higher dose levels are employed for the drinking water route than for the solid feed method of administration, and levels of the nitroimidazole compound in the drinking water of from about 0.025% to about 0.1% by weight are quite satisfactory.

The following examples are given for the purpose of illustration and not by way of limitation.

EXAMPLE 1

1-[β-hydroxyethyl)-2-morpholinomethyl-5-nitroimidazole 0.8 gm. (3.5 mm.) of 1-(β-acetoxyethyl)-2-hydroxymethyl-5-nitroimidazole is dissolved in 50 ml. of benzene. The solution is warmed to reflux and 20 ml. of thionyl chloride added. The reaction mixture is refluxed for five minutes then evaporated in vacuo to dryness. The residue thus obtained is flushed with benzene and then dried in vacuo to remove any residual thionyl chloride. The resultant 1 - (β-acetoxyethyl) - 2 - chloromethyl-5-nitroimidazole hydrochloride is a white, crystalline, hydroscopic substance.

The 1 - (β-acetoxyethyl)-2-chloromethyl-5-nitroimidazole hydrochloride is dissolved in a minimum volume of benzene. 5.0 ml. of morpholine are added, and the mixture stirred at room temperature for 45 minutes. The reaction mixture is then concentrated to dryness in vacuo and the residue is dissolved in 20 ml. of water. The aqueous solution is made strongly alkaline (to pH 10) with aqueous NaOH and extracted with 3× 100 ml. portions of chloroform. The chloroform extracts are combined, filtered, dried and finally evaporated to dryness in vacuo.

The 1 - (β-acetoxyethyl)-2-morpholinomethyl-5-nitroimidazole (687 mg.) thus obtained is an oil containing small amounts of acetyl morpholine and 1-(β-hydroxyethyl) - 2 - morpholinomethyl-5-nitroimidazole. It is dissolved in 10 ml. of ethanol and 10 ml. of 4 N hydrochloric acid and the solution refluxed for ½ hour. It is then evaporated in vacuo to dryness. The residue is dissolved in 10 ml. of water and neutralized with sodium hydroxide. The aqueous solution is extracted with 3× 50 ml. portions of ethyl acetate. The ethyl acetate extracts are combined, backwashed with water and evaporated in vacuo to dryness. The residual oil is crystallized from benzene-hexane to give 1-(β-hydroxyethyl)-2-morpholinomethyl-5-nitroimidazole. Recrystallization from benzene-hexane affords substantially pure material, M.P. 121–122° C.

The 1-(β-acetoxyethyl) - 2 - hydroxymethyl-5-nitroimidazole employed as starting material for this experiment is conveniently obtained by a process which is not a part of the present invention but which is rather the invention of our colleague Janos Kollonitsch, and which is the following:

1.4 g. of 1-(β-acetoxyethyl)-5-nitroimidazole, 1.05 g. of paraformaldehyde and 5 ml. of dimethylsulfoxide are placed in a glass tube. The tube is sealed and heated at 110° C. for 24 hours. The mixture is then removed and concentrated to dryness in vacuo. The residue is extracted with 5 ml. of hot hexane. The hexane-insoluble material is dissolved in about 10 ml. of benzene. The benzene solution is concentrated to about a 5 ml. volume, and hexane added slowly to induce crystallization of 1-(β-acetoxyethyl) - 2 - hydroxymethyl-5-nitroimidazole. The product thus obtained is recovered by filtration and air dried, M.P. 88–90° C. Yield: 81% of theoretical.

1-(β-hydroxyethyl)-2-hydroxymethyl - 5 - nitroimidazole is obtained by repeating the above experiment and using as starting material 1-(β-hydroxyethyl) - 5 - nitroimidazole.

Other 1 - $(CH_2)_nOAc$-2-hydroxymethyl-5-nitroimidazoles, where $n$ is 2, 3 or 4, and Ac is lower-alkanoyl, e.g., acetyl, propionyl, butyroyl, or benzoyl, are obtained in similar fashion from the corresponding 1-$(CH_2)_nOAc$-5-nitroimidazoles.

EXAMPLE 2

When the compound of this invention is used for the treatment of trichomoniasis, it is generally compounded into suitable pharmaceutical formulations which include compressed tablets, coated tablets, capsules, suspensions or solutions for oral administration, and vaginal creams or suppositories for topical application. A typical example of a compressed tablet is:

| | Mg. per tablet |
|---|---|
| 1-(2'-hydroxyethyl) - 2 - morpholinomethyl-5-nitroimidazole | 250 |
| Dicalcium phosphate | 100 |
| Lactose | 75 |
| Starch | 50 |
| Guar gum | 12 |
| Magnesium stearate | 2 |

The imidazole is uniformly mixed with the other components and the mixture then compressed into tablets. The ingredients of the tablets may be varied using a diluent (instead of dicalcium phosphate or lactose) such as kaolin, calcium sulfate, sucrose or sorbitol; a granulating agent (in place of starch) such as gum acacia or gum tragacanth; a disintegrant such as dried starch or cellulose in place of guar gum); and a lubricant such as tak or stearic acid (in place of magnesium stearate.

Tablets may be sugar coated by applying a heavy sugar syrup, or enteric coated by spraying with a material such as cellulose acetate phthalate.

Capsules are prepared by blending the antitrichomonal agent with a filler such as starch, lactose or kaolin, and lubricating with calcium or magnesium stearate before encapsulation. A typical capsule has the composition:

| | Mg. |
|---|---|
| 1-(2'-hydroxyethyl) - 2 - morpholinomethyl-5-nitroimidazole | 250 |
| Calcium stearate | 2 |
| Lactose, to fill No. 0 capsule | Ca. 75 |

For vaginal creams the nitroimidazole compound is blended with sufficient quantities of hydrophilic ointment and water to give a cream of the desired consistency and containing 10% by weight of the imidazole. For vaginal suppositories, from 100–500 mg. of nitroimidazole compound of the invention is blended with about 5 grams of theobroma oil U.S.P. or a mixture of polyethylene glycols.

What is claimed is:
1. 1-(2'-hydroxyethyl) - 2 - morpholinomethyl-5-nitroimidazole.

References Cited

UNITED STATES PATENTS
No references cited.

ALEX MAZEL, Primary Examiner

J. TOVAR, Assistant Examiner

U.S. Cl. X.R.

260—247.2 A, 309; 424—248